United States Patent
Filmer et al.

(10) Patent No.: US 12,421,570 B2
(45) Date of Patent: Sep. 23, 2025

(54) HEAP LEACHING

(71) Applicants: ANGLO AMERICAN TECHNICAL & SUSTAINABILITY SERVICES LTD, London (GB); ANGLO CORPORATE SERVICES SOUTH AFRICA (PTY) LTD., Rosebank (ZA)

(72) Inventors: Anthony Owen Filmer, Kangaroo Point (AU); Christopher Alan Biley, Johannesburg (ZA); Daniel John Alexander, St Albans (GB)

(73) Assignees: ANGLO AMERICAN TECHNICAL & SUSTAINABILITY SERVICE LTD, London (GB); ANGLO CORPORATE SERVICES SOUTH AFRICA (PTY) LTD., Rosebank (ZA)

(*) Notice: Subject to any disclaimer, the term of this patent is extended or adjusted under 35 U.S.C. 154(b) by 0 days.

(21) Appl. No.: 17/926,882

(22) PCT Filed: May 21, 2021

(86) PCT No.: PCT/IB2021/054414
§ 371 (c)(1),
(2) Date: Nov. 21, 2022

(87) PCT Pub. No.: WO2021/234653
PCT Pub. Date: Nov. 25, 2021

(65) Prior Publication Data
US 2023/0227935 A1    Jul. 20, 2023

Related U.S. Application Data

(60) Provisional application No. 63/028,616, filed on May 22, 2020.

(51) Int. Cl.
*C22B 3/04* (2006.01)
*C22B 11/00* (2006.01)
*C22B 15/00* (2006.01)

(52) U.S. Cl.
CPC ............... *C22B 3/04* (2013.01); *C22B 11/00* (2013.01); *C22B 15/00* (2013.01)

(58) Field of Classification Search
CPC ........... C22B 3/04; C22B 11/00; C22B 15/00; C22B 11/04
See application file for complete search history.

(56) References Cited

U.S. PATENT DOCUMENTS 6,146,444 A    11/2000   Kohr

FOREIGN PATENT DOCUMENTS

| CA | 2449467 C | * | 3/2010 |
| CL | 57368 | | 2/2015 |

(Continued)

OTHER PUBLICATIONS

Robertson et al., "Advances in high-temperature heap leaching of refractory copper sulphide ores", The Journal of the Southern African Institute of Mining and Metallurgy, vol. 112, Dec. 2012, pp. 1045-1050.

(Continued)

*Primary Examiner* — Anthony M Liang
(74) *Attorney, Agent, or Firm* — NIXON PEABODY LLP; Jeffrey L. Costellia

(57) ABSTRACT

THIS invention relates to a method of recovering metal values such as gold, copper, nickel, zinc and uranium from ores containing said metal values. The method includes the steps of crushing an ore (10) to provide a sand containing metal values with a $P_{80}$ of less than 5 mm but greater than 1 mm; classifying the sand (12) to remove a finer fraction to provide classified sand with a $P_{10}$ of greater than 0.15 mm, (Continued)

and a $P_{90}/P_{10}$ ratio of less than 25 and greater than 3, forming a heap (18) from the classified sand, and distributing leachant and air through the heap to leach the values from the sand in a pregnant leachate, from which the leached values may be recovered. The invention also relates to a heap formed from ore processed by this method.

29 Claims, 5 Drawing Sheets

(56) References Cited

FOREIGN PATENT DOCUMENTS

| | | | | |
|---|---|---|---|---|
| CN | 104745811 | | 7/2015 | |
| RU | 2476610 C2 | * | 2/2013 | |
| WO | WO-2007/134343 | | 11/2007 | |
| WO | WO-2016063187 A1 | * | 4/2016 | ............... C22B 1/00 |
| WO | WO-2016/170437 | | 10/2016 | |
| WO | WO-2018/234880 | | 12/2018 | |

OTHER PUBLICATIONS

Wang et al., "Equations for hydraulic conductivity estimation from particle size distribution: A dimensional analysis", Water Resources Research/vol. 53, Issue 9, Sep. 6, 2017; pp. 8127-8134.

Gautama et al., "Characterization and Utilization of Fly and Bottom Ash (FABA) in Indonesia View project", Big Data Analysis View project, (2016) (7 pages).

Bouffard, "Review of Agglomeration Practice and Fundamentals in Heap Leaching", Article in Mineral Processing and Extractive Metallurgy Review, Jul. 2005, pp. 1-12.

Wikipedia, "Sand", Dec. 27, 2019, retrieved from https://en.wikipedia.org/w/index.php?title=Sand&oldid=932733100, (8 pages).

Yin et al., Comparison of sample properties and leaching characteristics of gold ore from jaw crusher and HPGR, Minerals Engineering 111, 2017, pp. 140-147.

Miller et al., "Ultimate recovery in heap leaching operations as established from mineral exposure analysis by X-ray microtomography", International Journal of Mineral Processing, vol. 72, 2003, pp. 331-340.

International Search Report for Application No. PCT/IB2021/54414, mailed Aug. 12, 2021 (3 pages).

Robertson, et al., "Implications of Hydrodynamic Testing for Heap Leach Design", Hydroprocess2013, Jul. 10-12, 2013, Santiago, Chile, pp. 1-12.

Watling, "Chalcopyrite hydrometallurgy at atmospheric pressure: 1. Review of acidic sulfate, sulfate-chloride and sulfate-nitrate process options", Hydrometallurgy, No. 140, 2013, pp. 163-180.

Beard et al., "Influence of Texture on Porosity and Permeability of Unconsolidated Sand", The American Association of Petroleum Geologists Bulletin, vol. 57, No. 2, Feb. 1973, pp. 349-369.

Chinese Office Action issued in Chinese Application No. 202180037239.4, mailed Dec. 24, 2024 (10 pages).

Ghorbani et al., "Heap leaching technology—current state, innovations and future directions: A review", Mineral Processing and Extractive Metallurgy Review, Nov. 20, 2015.

* cited by examiner

HEAP LEACHING

BACKGROUND OF THE INVENTION

Conventional heap leaching provides a low cost and water efficient method of metal recovery, but suffers from low extractions of the contained values due to
- zones within the individual rocks with inadequate conditions for leaching caused by micro-permeability within the rock heap
- zones within the heap with inadequate conditions for leaching caused by variable macro-permeability in the heap; and
- reprecipitation of values caused by problematic gangue causing localized macro-permeability These low extractions mean heap leaching is only used for processing low grade ores, where the low cost is a more important factor than high recovery. For most of the worlds production, finer grinding and flotation or agitation leaching is the preferred processing route.

Micro-permeability is term used to describe the ease with which leachant can access the contained values within the solid particles, allowing dissolution of the values, and then remigration of pregnant leachant out from the particle to ultimately be recovered through gravity at the base of the heap. This level of micro-permeability can be estimated using X-ray tomography. (Miller—Int. J. Miner. Process. 72 (2003) 331-340), the content of which is incorporated herein by reference.

The greater the exposure of the mineralised particles to leachant, whether it be through grain exposure on the surface of a gangue particle, or through a microcrack in the surrounding gangue, the greater the recoverable mineral of value.

The largest determinant of micro-permeability is particle size. Smaller diameters increase the probability that the valuable mineral grain is located either on the surface of a particle, or at least accessible in a crack large enough for acceptable leachate access rates. For example, in the work of Miller, a copper ore showed exposures exceeding 90% at below 3 mm.

But the micro-permeability is also a function of the way the rocks are crushed. It is also dependent on the mineralogical properties that affect rock fracture under stress.

The ultimate extension of this micro-permeability benefit is agitation leaching, where finely ground ore can be leached at rates and total extractions that are determined by the chemical reaction rate, rather than through intra-particle diffusion. But agitation leaching comes at a considerable capital and operating cost of the grinding and agitation leaching equipment; and becomes impractical for low grade ores or leach durations beyond around 24 hours.

For heap leaching, solving the micro-permeability constraint by crushing finer, creates a different set of constraints in the macro-permeability of the heap. The term macro-permeability is used to describe the permeability to fluid flow that exists through the bulk of the heap, i.e. over distances of centimeters or metres in the various locations within the heap.

The macro-permeability of a heap decreases as the crush size is reduced, due to excessive proportion of fines impeding the flow of both leachant and air through the heap. Even at a reasonably coarse crush size, e.g. 100 mm, segregation can occur during heap formation and compaction during operation, due to the wide particle size distribution.

Variable macro-permeability can impact both air and leachant flows within some sections of a heap, such that low leaching extractions are achieved in some zones either due to localized flooding or a deficiency of leachant within the zone of low permeability, or in the 'rain shadow' caused by this the low variability zone, or poor aeration through the section of the heap.

This variability exists because of accumulation of the fines in the ore, resulting from either fracture and segregation during heap preparation; or by excessive comminution. They tend to further consolidate during stacking of the heap and leaching. The fines block ongoing leachant access to a zone within the heap.

Illustrating this factor is the Hazen equation (https://agupubs.onlinelibrary.wiley.com/doi/full/10.1002/2017WR020888) which empirically relates the macro-permeability of any material to the $10^{th}$ percentile of the particle size distribution in any zone within the heap.

The macro-permeability of an accumulation of particles is a function of absolute particle size. It is also affected by the particle shape and the particle size distribution which define the void ratio in the heap. Void ratio is important because mixtures of different particle sizes will naturally consolidate to a higher packing density, with the finer particles filling the interstices of the coarser particles.

Another expression of the macro-permeability is hydraulic conductivity. However, for heaps formed from very different particle sizes, this measure may be very different in the different zones within the heap. Thus, another effective measure is the time taken for the heap to drain.

So, in conventional heap leaching, the primary determinant of macro-permeability of the heap is absolute size achieved during crushing. In effect, this crush size affects the proportion of fines generated during the crushing process. When the particle size becomes small, a layer of adherent liquid accumulates around the particles. Where this layer thickness is of a similar magnitude to the gap between sand grains, the flow of either liquid or gas phase is inhibited. A second determinant is the relative particle size distribution, where uniformly sized particles have a higher conductivity than wide size ranges, as the latter can pack more tightly during heap consolidation.

For these reasons relating to macro-permeability, the top crush size of normal heap leaching is typically between 10 mm and 500 mm, thus avoiding the formation of excessive fines.

To reduce the impact of fines in conventional heap leaching, fines are sometimes agglomerated prior to heap construction. Agglomeration causes the fines to adhere strongly to the coarser rocks. With well controlled stacking to prevent excessive deagglomeration, it results in improved macro-permeability between agglomerates, but has an adverse micro-permeability impact within each agglomerated entity. For this reason, the leachate is typically used as a binding agent for the agglomerate. This reduces the magnitude of micro-permeability issues caused by the coating of fines.

Whilst finer crushing and agglomeration can increase extractions for some ores that are well suited to heap leaching, the balance of cost and benefits does not make it effective for all ores. Nor does agglomeration allow for varying the operating conditions of the heap, for example by utilising multiple leachants to treat different mineral species. Nor does agglomeration fully overcome the issues of access of the leachant to valuable material locked in the coarser substrate pebbles, that form the centre of the agglomerates.

So, a balance is sought in conventional heap leaching involving either; coarser crushing with acceptance of a modest extraction in the heap leach (typically around 65%); or crushing to a finer size of around 12.7 mm and agglomerating the fines prior to stacking to achieve a slightly higher extraction (typically around 80%).

Whilst not in commercial practice, physical removal of the fines prior to heap leaching has also been suggested. To optimise processing of fine component of ores by a beneficiation, both WO2016/170437 and U.S. Pat. No. 6,146,444 remove the fines for separate beneficiation, prior to heap leaching the remaining ore.

Both these patents are at a finer grind than has typically been used in conventional heap leaching. They are both directed towards novel processing routes from the finer fraction of the ore. Both nominate heap leaching of the residual coarser fraction of the ore, containing a modest proportion of the total values, following the size classification for the primary mode of values recovery.

The particle size claimed by WO2016/170437 is limited to an upper size of 1 mm, thus constraining the proportion of values recoverable by heap leaching, rendering heap leaching a minor method of values production. Heap leaching of the ore above 1 mm is not considered.

And for U.S. Pat. No. 6,146,444, the heap leach is directed to gold liberation from pyrite, not direct gold extraction. Thus, quantitative extraction of the pyrite is not the key objective of the leach, in the same way that it would be if pyrite were the primary value.

Neither author considers the impact of the fines removal on the macro- and micro-permeability of the coarser fraction during its heap leaching, and the extraction efficiency and flexibility in heap operation.

The size separation in U.S. Pat. No. 6,146,444 is by wet or dry screening of an ore crushed to between 6 and 20 mm. The screening occurs at between 0.6 and 2 mm, with the fine fraction being assigned to other beneficiation methods to recover pyrite and leach gold. The oversize fraction (>0.6-2 mm) represents around half the weight of the ore, up to a top size of 25 mm, is assigned to heap leach to dissolve pyrite. This heap leach is supplemented by adding back pyrite recovered during flotation or gravity separation of the finer fraction. The additional pyrite not only liberates more contained gold, but also accelerates bioleaching in the heap. These combined effects lead to higher gold extractions in a separate leaching process.

It is apparent to people skilled in the art, that the removal of fines by U.S. Pat. No. 6,146,444 will partially resolve issues of macro-permeability in the heap, particularly the desliming as was noted by U.S. Pat. No. 6,146,444. However, the quantitative impact of the removal of the ore smaller than 0.6-2 mm on heap macro-permeability is unclear.

With respect to micro-permeability, U.S. Pat. No. 6,146,444's upper crush size is only slightly finer than the typical agglomeration size in conventional heap leaching, and hence the issues of micro-permeability remain.

This impact of micro-permeability on leaching rate of pyrite is clearly demonstrated in FIG. 2 in U.S. Pat. No. 6,146,444, where the dissolution of 0.25-inch material, the finest crush size claimed, is slow. Only around 15% of the pyrite is bio-oxidised in 300 days, compared to 55% extraction at 2 mm. Whilst these extractions may be satisfactory for partially removing a problematic element such as pyrite on a proportion of the total ore, they are inadequate for recovery of the primary values during normal heap leaching.

WO2016/170437 follows a different comminution and beneficiation path, grinding the ore to a finer size, p80 less than 1 mm and most preferably less than 0.6 mm, then applying coarse particle flotation in a teeter bed reactor. Coarse particle flotation recovery up to around 0.5 mm is efficient, leaving a disposable residue. If the grind size is extended up to the 1 mm limit of the claims, the coarse particle flotation process is split to generate a middlings residue stream. Recovery from this 0.5-1 mm fraction of the ore is somewhat lower, due to the reduced liberation of values during comminution. Hence the middlings residue is still contains significant values. WO2016/170437 notes that this residue is at a quite a low grade and suitable for storage or for heap leaching.

With these preferred and upper size dimensions in the claims, the middlings residue from coarse flotation will represent between 0-30% of the total weight of the ore being comminuted. And due to natural deportment during comminution and partial extraction of the values by coarse flotation, it will typically contain less than 10-20% of the total metal values. As such, heap leaching is not a major component of the overall production.

No teaching is provided by WO2016/170437 on the impact of the middlings preparation on either the heap leaching conditions or heap preparation. Nor is guidance provided on methods by which the majority of the values could be recovered from this middlings fraction by heap leaching.

In a separate patent relating to heap leaching after removal of fines below around 0.5 mm, WO2018/234880 utilises heap leaching a scavenging mechanism for the low-grade ore fractions rejected during bulk sorting, and coarse particle flotation, combining these streams from which the fines are removed into a heap for heap leaching. Optionally, further intermediate size classifications may be introduced, with the coarser ore fractions added to the heap leach feed.

Whist the removal of fines by WO2018/234880 will enhance the macro-permeability, the particle sizes from bulk sorting and screening are typical of conventional heap leaching and such that micro-permeability issues will remain.

The range of particle size distributions will be very wide and hence issues of macro-permeability will also occur due to consolidation in parts of the heap.

Returning to conventional heap leaching, a further complication exists for the most abundant copper ores, which contain significant quantities of chalcopyrite. The chalcopyrite reacts very slowly under normal heap leach conditions.

Other conditions have been identified for leaching primary copper ores containing significant chalcopyrite. Controlling the leach within a specific range of oxidation potential formed with the cupric-cuprous couple, in a high chloride acidic environment enables acceptable chalcopyrite leaching rates for consideration in conventional heap leaching. (Muller—WO2007/134343A2).

Similarly, leaching with a ferric sulphate solution more typical of that produced during bio-oxidation in a heap, at temperatures over around 60° C., enables acceptable chalcopyrite leaching rates for consideration in conventional heap leaching. (Robertson—J. S. Afr. Inst. Min. Metall. vol. 112 n.12 Johannesburg January 2012).

However, the macro- and micro-permeability of conventional heaps make these higher cost leachants problematic for conventional heap leaching of primary copper ores. For example, utilising the acidic copper chloride solution over the extended heap leaching period consumes significant acid, and locks up substantial working capital, and results in excessive reagent dilution and losses over the full heap leaching cycle. In the case of high temperature heap leaching, initiating and maintaining the full heap at temperatures in excess of 60° C. over the extended period of conventional heap leaching, requires significant external heat input.

For all these reasons, commercial heap leaching of primary copper ores has been limited to opportunistic leaching, with copper extractions up to around 20%. The chalcopyrite content of these ores goes largely unleached.

So, despite the many efforts to optimise conventional heap leaching, the overall extraction of metals using heap leaching technology remains lower than that achievable by flotation or agitation leaching of the same ore. Conventional heap leaching relies on lower costs for its applications and is primarily directed to treat low grade ore resources that can be readily dissolved.

In summary, the macro- and micro-permeability constraints result in conventional heap leaching being a second-tier method of metals production.

SUMMARY OF THE INVENTION

THIS invention relates to a method of recovering metal values such as gold, copper, nickel, zinc and uranium from ores containing said metal values such as gold ore (including pyritic gold ore and copper gold ore), copper ore (including copper sulphide, primary copper, secondary, transition and oxidised copper ore), nickel ore (including nickel sulphide, mafic and ultramafic nickel ore), zinc ore, and uranium ore in a sand heap with high macro- and micro-permeability.

The method includes the steps of:
crushing an ore containing metal values to a size where at least 85% of the valuable mineral grains are exposed, to provide a sand containing metal values with a $P_{80}$ of less than 5 mm, and preferably less than 3 mm, and even more preferably around 2 mm, but greater than 1 mm;
classifying the sand (i.e. passing the sand through a screen or screens) to remove a finer fraction (i.e. to remove particles less than 0.1 mm, or less than 0.2 mm, or less than 0.3 mm or less than 0.4 mm in size), to provide classified sand with a $P_{10}$ of greater than 0.15 mm, or greater than 0.25 mm or greater than 0.3 mm or greater than 0.4 mm, and a $P_{90}/P_{10}$ ratio of less than 25, less than 20, less than 18, or less than 15; and greater than 3, greater than 5, or greater than 8, and preferably a water permeability greater than $10^{-5}$ m/s, more preferably greater than $5 \times 10^{-4}$ m/s;
forming a heap from the classified sand, where the heap preferably has a permeability greater than $10^{-5}$ m/s, more preferably greater than $5 \times 10^{-4}$ m/s; and
distributing leachant and air through the heap to leach the values from the sand in a pregnant leachate, from which the leached values may be recovered.

Typically, sand heap leaching is used as the primary recovery method and more than 50% of the ore is recovered as sand, and processed by sand heap leach, and preferably more than 60%, and even more preferably around 70%.

Typically, there is no prior beneficiation step such as flotation, gravity separation or magnetic separation on the ore assigned to the leaching step.

The sand heap leach may be undertaken in a fixed or a dynamic heap with a residence time of less than 2 years, and preferably less than 6 months and even more preferably less than 3 months.

The heap is preferably free draining, to achieve less than 15% contained water within 2 weeks of ceasing irrigation, and preferably within 1 week, and even more preferably around 3 days.

The heap may be subjected to more than one irrigation and drain cycles, to sequentially enhance aeration and leaching.

Multiple leachants may be used sequentially to remove problematic gangue and then to recover the valuable components from the sand heap. For example, an ore containing both copper and gold could be heap leached initially to extract the copper, then washed, and subsequently leached with a different reagent to extract the gold.

Losses of leaching reagents, and management of water balance, may be reduced through efficient washing and draining of the leached sand heap.

The sand may be deposited on the heap by being flung from a discharge point using a hydraulic or mechanical device The sand may be stacked in lifts of height of greater than 5 meters and preferably greater than 10 meters, even greater than 20 meters and up to 40 meters.

The sand may be leached in a dynamic heap, which is then removed from the dynamic pad by hydraulic mining techniques. The term "dynamic heap" means a heap which is constructed on a fixed pad, leached, and then reclaimed for storage elsewhere, leaving the pad available to leach further ore.

THIS invention also relates to a sand heap with high macro- and micro permeability, the sand in the heap comprising a crushed ore containing metal values such gold, primary copper, secondary copper, nickel, zinc, and uranium, and the sand having a particle size $P_{10}$ of greater than 0.15 mm, or greater than 0.25 mm or greater than 0.3 mm or greater than 0.4 mm, and a $P_{90}/P_{10}$ particle size ratio of less than 25, less than 20, less than 18, or less than 15; and greater than 3, greater than 5, or greater than 8, and preferably a permeability greater than $10^{-5}$ m/s, more preferably greater than $5 \times 10^{-4}$ m/s.

The sand heap may be stacked in lifts of height of greater than 5 meters and preferably greater than 10 meters, even greater than 20 meters and up to 40 meters.

DESCRIPTION OF PREFERRED EMBODIMENTS

Figure 1:
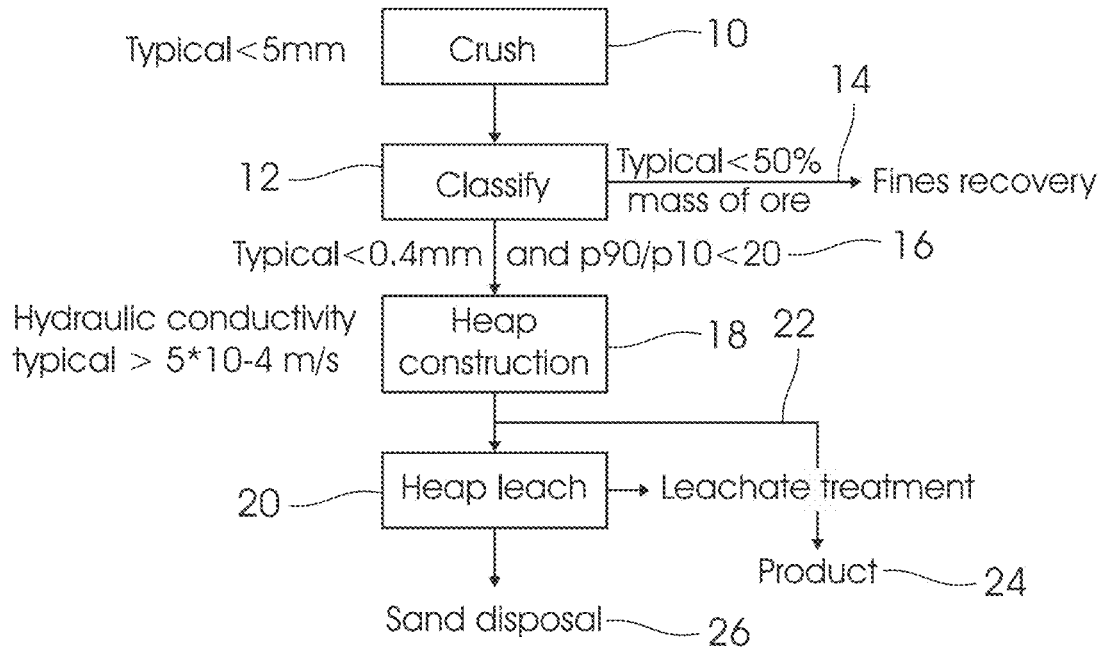
FIG. 1 is a block flowsheet of a method of heap leaching of the present invention.

The current invention is a method in which sand is prepared and stacked such as to form a heap with suitable macro- and micro-permeability, to yield faster and higher extractions of the metals of interest.

The selection of particle size is critical, to achieving both the micro-permeability and macro-permeability required for rapid and complete heap leaching.

The creation of macro- and micro-permeability of the ore particles in the sand heap not only enables high extractions in sand heap leaching, but also creates heap properties which enable effective use of a wider range of leachants. Examples of such leachants are those of higher cost, such as using cupric chloride as an oxidant, or glycine as a complexant, where the working capital and reagent losses are excessive in a conventional heap leach.

The macro-permeability is achieved by preparing a sand with a high exposure of the minerals of value, at least 85%, and within a narrow size distribution, and with a lower size limit to allow free draining of leachant from the heap due.

This combination of properties enables sand deposition without excessive consolidation during the heap formation. The ratio of $P_{90}/P_{10}$ sizes ensures a satisfactory void ratio. With this narrow size distribution, the leachate and air can flow uniformly through the heap, whilst the leachant can access most of the available mineral species of value.

The lower size limit ($P_{10}$) is set to generate a free draining sand heap, i.e., the hydraulic conductivity will exceed $10^{-5}$ m/s, allowing the heap to drain within days to less than 15% contained moisture. The lower size limit is essential to achieve heap macro-permeability and is described by the Hazen equation. Resultant is the ability to drain the heap to achieve a high and uniform recovery of leachate. The void ratio must be such that even during irrigation, air is able to flow between particles, to maintain the oxidation potential in the heap.

The optimum quantum of relatively fine sand is also dictated by the balance between gravitational and capillary forces, with sufficient fines present to enable lateral transfer of leachant through the heap. This is typically >5% by weight in the heap.

The upper size limit ($P_{90}$) of the sand is set to ensure effective micro-permeability enabling high extractions, and to ensure the void ratio within the heap is adequate. The present inventors have quite unexpectedly found that with the micro-permeability and macro-permeability characteristics attained by the process of the present invention, extractions using sand heap leaching can be increased exponentially to those achievable by fine grinding and extended agitation leaching, and even superior to that achievable by alternative recovery technologies, such as flotation.

As previously noted, the upper size at which the values will be sufficiently exposed to enable leaching of a particular ore, will be dependent on grain sizes of the valuable minerals, and the fracture properties of the minerals and gangue. And in practice, the acceptable extraction will be also dictated the head grade of the ore being leached to form a disposable residue.

For example, a coarse grained, low grade copper ore, which had been previously exposed to coarse beneficiation; might have an upper size of 5 mm with an exposure of around 85%, whereas a fine grained, high grade copper ore would require finer comminution to achieve a disposable residue after sand heap leaching. Above around 5 mm, the differential fracture along grain boundaries is insufficient to generate the required microcracking.

Hence, according to the present invention, the preferred upper size of the comminuted ore is a $P_{80}$ of less than 5 mm, and preferably less than 3 mm, and even more preferably around 2 mm, but greater than 1 mm.

To meet the macro-permeability requirements the ore must be of sufficient diameter that the heap is free draining with permeability exceeding $10^{-5}$ m/s, and preferably greater than $5 \times 10^{-4}$ m/s. This requires a $P_{10}$ of greater than 0.15 mm, and preferably greater than 0.25 mm. Achieving an effective void ratio requires a $P_{90}/P_{10}$ of less than 20, and preferably less than 15.

To achieve these macro and micro-permeability criteria, the comminuted ore must be classified to remove the fines prior to assignment of the coarse fraction to sand heap leaching. Through efficient comminution and classification, up to around 70% of the ore can be assigned to sand heap leaching, within the specified size limits.

The remaining finer ore must be processed separately by flotation or agitation leaching. Like conventional heap leaching, but unlike U.S. Pat. No. 6,146,444, WO2016/170437 or WO2018/234880, sand heap leaching can be the primary method of values production; with supplementary production from the fines.

With reference to FIG. 1, in an embodiment of the invention, ore is crushed 10 (in a crusher such as a HPGR (high pressure grinding rolls), SAG (semi autogenous grinding) mill, VSI (vertical shaft impactor), or Cone crusher), typically to less than 5 mm in size, to provide a p80 of less than 5 mm. Crushed ore is then classified (i.e. screened) 12 to remove fines 14 less than 0.4 mm in size and to provide a sand 16 with a particle size greater than 0.4 mm and a $P_{90}/P_{10}$ of about 12.5. The sand 16 is deposited in a heap 18 which has a typical hydraulic conductivity of greater than $5 \times 10^{-4}$ m/s. The heap 18 is subjected to a heap leach treatment with leachate 22 from which product 24 containing metal values is obtained, and which is recirculated to the heap leach 20. After the heap leach is completed a sand 26 depleted of metal values may be disposed of.

Leaching Flexibility Arising from Sand Heap Leach

The macro and micro-permeability achievable in a sand heap with this particle size distribution create some additional characteristics that are quite different from a conventional heap. The distribution of leachant and air flows within the narrow particle size distribution of the sand heap is very uniform; the time required to achieve high extractions in sand heap leaching is short; and the heap drains uniformly and rapidly to a low moisture content.

These three unique characteristics of the sand heap provide a flexibility to adjust and control heap leach conditions, in ways that are not feasible in conventional heap leaching.

The uniform distribution of leachant and air within the sand heap enables all zones of the heap to be exposed to effective leaching conditions. Indeed, through adjusting heap construction and operations, factors such as the oxidation potential and heap temperature can be controlled to a greater level of uniformity in the various zones within the heap.

This improved control of oxidation potential within the heap is of particular relevance to leaching of primary copper ores, where tight control of potential in both sulphate and chloride solutions avoids the passivation of chalcopyrite. (Watling—Hydrometallurgy 140 (2013) 163-180), the content of which is incorporated herein by reference.

As a consequence of the improved leachant and air distribution, higher extractions can be achieved.

The second source of flexibility arising from sand heap leaching is the high micro-permeability leading to a much shorter residence time to achieve a high metal extraction.

For those minerals such as free milling gold, secondary and oxidised copper ores, in which the chemical dissolution is fast, i.e. will leach completely within a couple of days of agitation leaching under ambient conditions, leaching times in a sand heap leach can typically be reduced to less than 3 months, and even less than 1 month.

This enables sand heap leaching of such ores to be undertaken on dynamic pads, at a rate and recovery commensurate with that achievable in vat or agitation leaching, and significantly higher than conventional heap leaching. These high extractions can be achieved without the infrastructure required for comminution to a fine size and materials movement during the vat or agitation leaching process.

The faster leaching rate achievable with sand heap leach also generates higher tenors of the pregnant leachate, enabling a reduction in the volume of leachate to be processed in subsequent metal recovery.

The leaching reaction for most ores is exothermic. Thus, the leaching creates a temperature increase in the heap, particularly where sulphide oxidation is occurring at a rate greater than heat losses from the heap. As an example, when conventionally heap leaching of copper ores, temperatures of up to around 70° C. have been recorded in some zones within the heap. These temperature increases support more rapid bio-oxidation and increased diffusion rates to raise micro-permeability within the particles. The use of sand heap leaching provides a faster leaching rate of the readily oxidised secondary copper minerals, and hence a greater temperature increase in the heap.

This temperature increase contributes in part to the higher extractions that can be achieved using sand heap leaching of secondary copper ores.

The faster temperature increase also provides a method for initiating the oxidation of chalcopyrite leaching, hence generating further heat. Furthermore, the relatively short period required to overcome micro-permeability constraints within particles to be leached, reduces the duration of that the heap must be maintained at the elevated temperatures to leach most of the chalcopyrite. Thus, sand heap leaching, as indicated in the current invention, enables the heap leaching of primary copper ores.

In yet another option for leaching primary copper ore at elevated temperatures, external heat inputs can be provided by techniques such as solar heating of the leachant. Normally, the residence time over which the heap must be retained at the elevated temperature is excessive, but with the shorter leach duration enabled by high micro-permeability, the potential for external heating is increased.

The third source of flexibility arising from sand heap leaching, is the free draining nature of the sand.

This efficient draining ensures a sharp tail of eluate on the completion of heap leaching. With a low residual leachate concentration in the heap, and with micro-permeability which enables quick release of the remaining leachate. It also means the heap can be washed without major dilution of the leachate. The losses of reagents are lower, and the water balance of the sand heap leaching is more readily managed.

As such the sand heap provides opportunities for the use of expensive leachants which cannot be economically considered in conventional heap leaching, where fluid flows are much less consistent and leachate entrainment within the heap is higher. One example might be the use of acidic copper chloride to leach primary copper ores. Other examples are glycine to leach copper or nickel sulphide ores, and more concentrated cyanide solutions to accelerate the leaching of gold.

The free draining and uniform nature of the heap also enables the intermittent application of leachate followed by a rest period during which most of the voidage in the heap is filled with air, without concerns about accessing zones which remain flooded or have been starved of leachant. This resting has been found to be beneficial in a number of conventional heap leaching operations.

The free draining nature of the heap also allows sequential use of different leachants without significant cross contamination between the leachants. This enables the use of dual leachants in a single heap, to initially remove problematic gangue, before recovering the mineral of interest, such as with pyritic gold ores. It also provides for the opportunity to sequentially leach copper gold ores.

Recent developments in the conventional heap leaching of primary copper ores indicate that high extractions of chalcopyrite can be achieved over a period of several years using acidic copper chloride in strong brine solutions. However, the gangue elements present in the ore consume significant acid, and since pyrite is not oxidised at the system's oxidation potential, this acid represents a consumable cost. Because the heap is free draining, it is possible to undertake a conventional heap leach first, to use the acid generated from pyrite in the ore to neutralise the basic gangue, then convert to the copper chloride system to leach the chalcopyrite content.

A similar pre-neutralisation can occur with nickel sulphide ores, with the use of pyrite and pyrrhotite generated during the flotation of the fines, to supplement the acid generation during sand heap leaching.

Extraction of gold, whether by agitation or conventional heap leaching, is usually limited to free milling gold ores. For those ores where the gold is locked in pyrite, either very fine grinding or prior oxidation of the pyrite is required to liberate the gold.

Bio-oxidation of pyrite using is one well known as a method of liberating the gold, and heap leaching is a low-cost method to achieve the liberation. But to recover the liberated gold using cyanide has complications. The bio-oxidation of pyrite takes place in an acidic environment and heap leaching is undertaken in a basic environment containing cyanide. The mixing of the two systems is hazardous, and the reagent requirement to neutralize the heap prior to gold leaching is high. Hence processes similar to that of U.S. Pat. No. 6,146,444, use heap leaching to liberate the gold, and follow this with milling, neutralisation and agitation leaching to recover the liberated gold.

A well-drained sand heap enabled by the current invention enables such a dual leachant approach, initial bio-oxidation in an acidic environment, followed by draining and neutralization, then cyanide heap leaching without hazard, with minimal additional reagent cost, and without the need for fine milling and agitation leaching.

Similar opportunities are created in gold ores with a high soluble copper content.

Examples of ore types that can be processed according to the present invention, leachants and in some cases sequential leachants are provided in Table 1 below.

TABLE 1

| Ore type | Leachant Opportunities | Indicative p90 mm | Indicative p10 mm | P90/P10 ratio | Sequential leachant required | Second leachant |
|---|---|---|---|---|---|---|
| Secondary and oxidised Cu | Bioleach | 4 | 0.2 | 20 | No | |
| | Acidic chloride | 4 | 0.2 | 20 | No | |
| Transition and primary copper | Hot bioleach | 4 | 0.4 | 10 | No | |
| | Acidic chloride | 4 | 0.4 | 10 | No | |
| | Glycine | 3 | 0.4 | 7.5 | No | |
| | Ammonia | 3 | 0.4 | 7.5 | No | |
| Primary copper gold | Hot bioleach | 4 | 0.4 | 10 | Yes | Cyanide |
| Gold | Cyanide | 3 | 0.2 | 15 | No | |
| Refractory gold in sulphide | Bioleach | 3 | 0.2 | 15 | Yes | Cyanide |
| Mafic nickel | Acidic bioleach | 3 | 0.3 | 10 | No | |
| | Near neutral bioleach | 3 | 0.3 | 10 | No | |
| | Glycine | 3 | 0.3 | 10 | No | |
| | Ammonia | 3 | 0.3 | 10 | No | |
| Ultramafic nickel | Neutral bioleach | 3 | 0.2 | 15 | Yes | Ammonia or glycine |
| | Bioleach | 3 | 0.2 | 15 | No | |
| | Glycine | 3 | 0.3 | 10 | No | |
| | Ammonia | 3 | 0.3 | 10 | No | |
| Zinc | Bioleach | 4 | 0.4 | 10 | No | |
| Uranium | Bioleach | 4 | 0.3 | 13.3 | No | |

Heap Construction Flexibility Created by Sand Heap Leach

The size range of sand in the current invention, as specified to meet the macro and micro-permeability requirements of sand heap leaching, also creates opportunities for different methods of heap construction and different heap designs.

Figure 2:
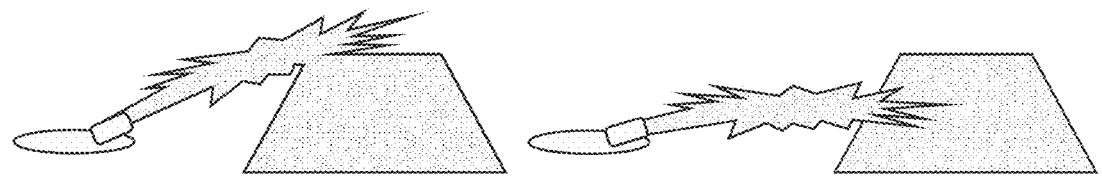
FIG. 2 is illustrations of heap construction methods.
Figure 2:
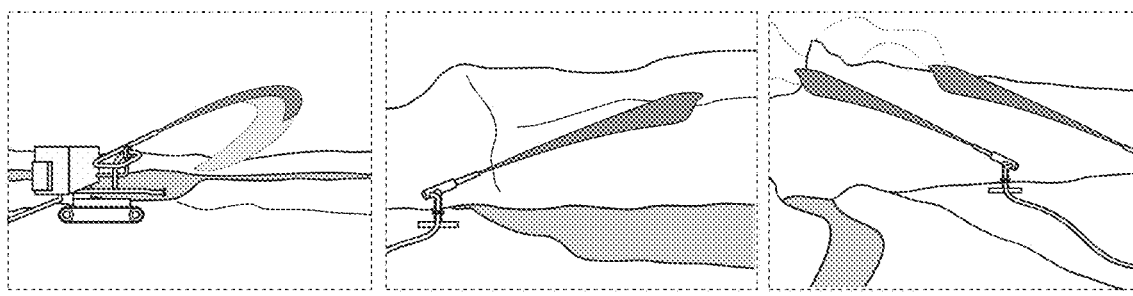

Conventional heaps are generally constructed by dump truck, but this causes issues with over compaction and fines generation caused by the pressure from the heavy equipment traversing the heap prior to and after dumping. An alternative method of conventional heap formation is a retreating conveyor stacker. This technique is expensive, and the infrastructure is fixed in location relative to the heap it is creating. Whilst both these techniques can also be used for sand heap formation, the uniformly sized sand can also be 'flung' in multiple dimensions, either hydraulically or mechanically, from an easily relocated sand discharge point. (see FIG. 2), which shows sand being deposited hydraulically using a high pressure water gun to carry the ore to be leached, and then drain prior to commencing leaching.

In this way the sand heap can be formed without vehicle access and without equipment that constrains heap location and dimensions in the deposition cycle. The uniform sand size also enables use of hydraulic mining techniques to recover the spent heap and pump the resultant residue slurry to a location for permanent disposal. As such, the potential for dynamic heap leaching on a permanent leach pad, is further enhanced, over and above the benefits of short residence time noted previously.

Conventional heap leaching typically has a lift height of 5-10 m, to retain effective vertical irrigation through the heap. Because of the even particle size of sand and the consistent macro-permeability, a reduced ability to consolidate, and the ability to drain and rest, this lift height for sand heap leaching can be increased significantly, particularly where under heap access is provided for forced air ingress.

The relatively small size of sand enables placement of air pipes within the heap, and hence reducing the depletion of oxygen in some zones, as the air flows through the heap. This placement of air pipes can be through drilling into the formed heap to inject the pipe; or as permanent fixtures in a dynamic heap which is formed around the fixed air pipe, with the sand later removed by hydraulic mining. Such an approach enables further extension of the heap height.

The uniform size of the sand in the sand heap leach creates an ideal distribution path for the flow of leachant and air through the heap. Segregation is limited during construction. Issues in conventional heaps associated with 'ratholing' and 'dead zones' are avoided in a sand heap of narrowly sized particles. This improved flow means that irrigation of the sides of the heap, and the aeration of the centre of the heap are much less problematic in a sand heap leach.

Experimental

Figure 9:
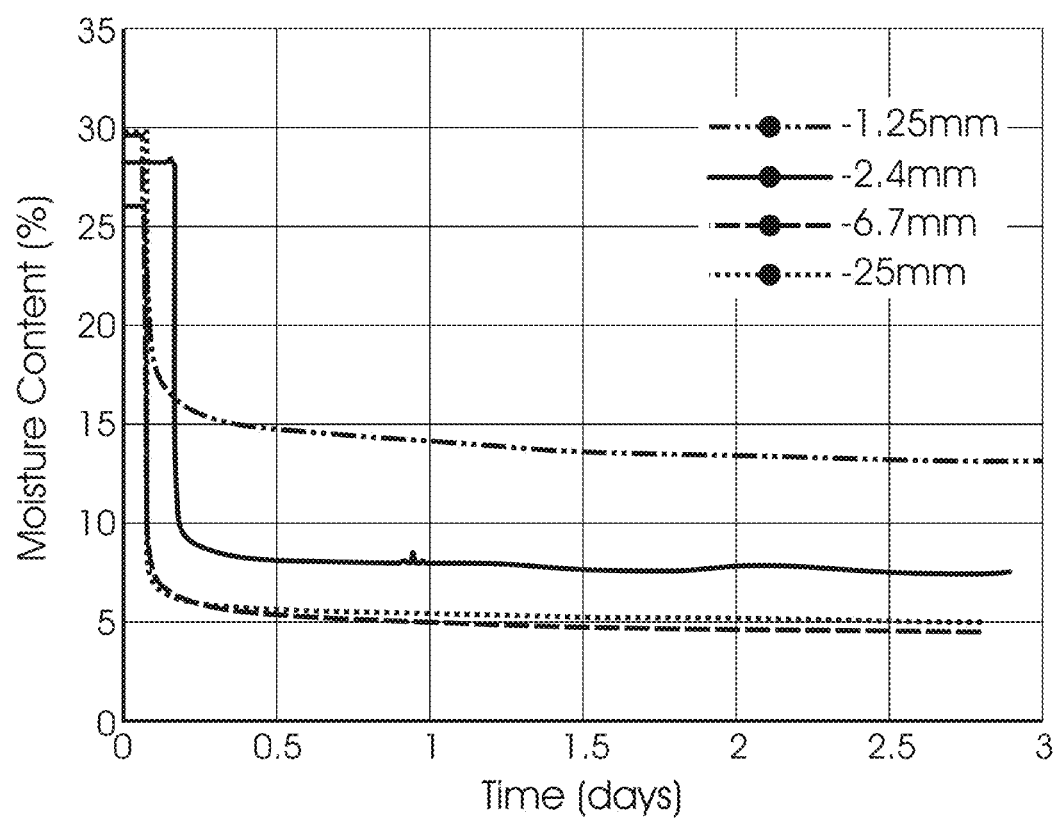
FIG. 9 is a graph showing the drain down profile of the copper ore samples reflected in FIG. 7, on cessation of irrigation.

Various size fractions of a transition copper ore were prepared by crushing the ore to −2.4 mm, −6.7 mm and −25 mm. The crushed fractions were then screened to yield relatively narrow particle size distributions as described in Table 2, which demonstrated excellent macro-permeability. Drainage of a 1 m column of these sands to less than 8% moisture, on cessation of irrigation, occurred in a few hours as shown in FIG. 9.

Figure 3:
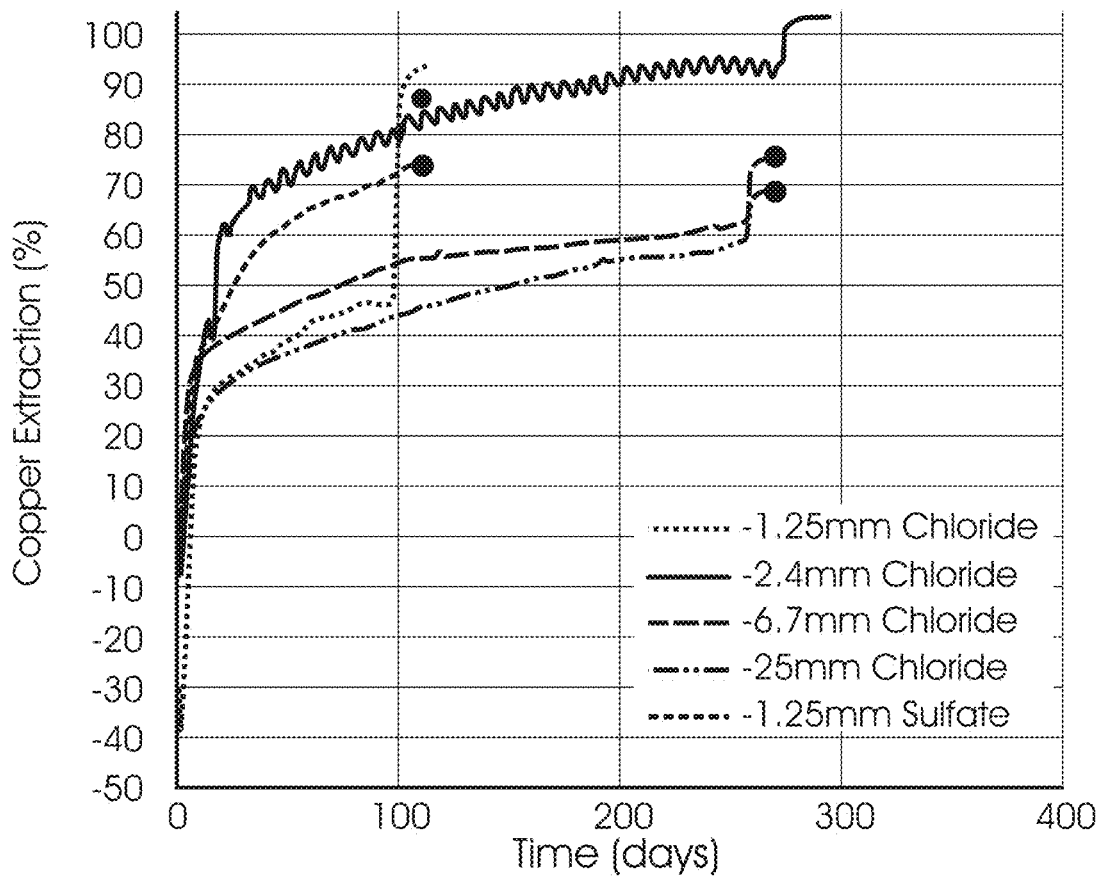
FIG. 3 is a graph showing the extraction of copper during the column leaching of a copper ore prepared into different particle sizes using acidic cupric chloride or ferric sulphate. Lines represent solution-based extractions and data points represent mass balanced extractions.

These fractions, containing 30-40% of the copper as chalcopyrite, were leached in 1 m columns at 25° C. using acidic cupric chloride at various pH, salt and cupric ion concentrations. FIG. 3 presents copper extractions calculated by solution balance that are uncorrected for inventory changes as well as, where available, mass-balanced definitive extractions. These results show that high extractions of the transition copper ore could be achieved, with the finer ores dissolving more rapidly and completely. The chloride system results presented in FIG. 3 represent identical experimental conditions apart from the use of intermittent irrigation for the −2.4 mm fraction. In these tests, high extractions of the easily dissolved components in the ore were achieved in around 10 days, whilst the more refractory component, i.e., chalcopyrite, was largely extracted within 150 days. The decreasing rate and extent of copper extraction with increasing particle size highlights the effect of micro-permeability.

TABLE 2

Particle size characteristics of column leach samples

| Sample Name | $P_{10}$ (mm) | $P_{50}$ (mm) | $P_{90}$ (mm) | $P_{90}/P_{10}$ |
|---|---|---|---|---|
| −1.25 mm | 0.17 | 0.38 | 0.79 | 4.5 |
| −2.4 mm | 0.58 | 1.43 | 2.16 | 3.7 |
| −6.7 mm | 0.51 | 3.30 | 5.97 | 11.7 |
| −25 mm | 1.18 | 13.20 | 22.55 | 19.1 |

Figure 7:
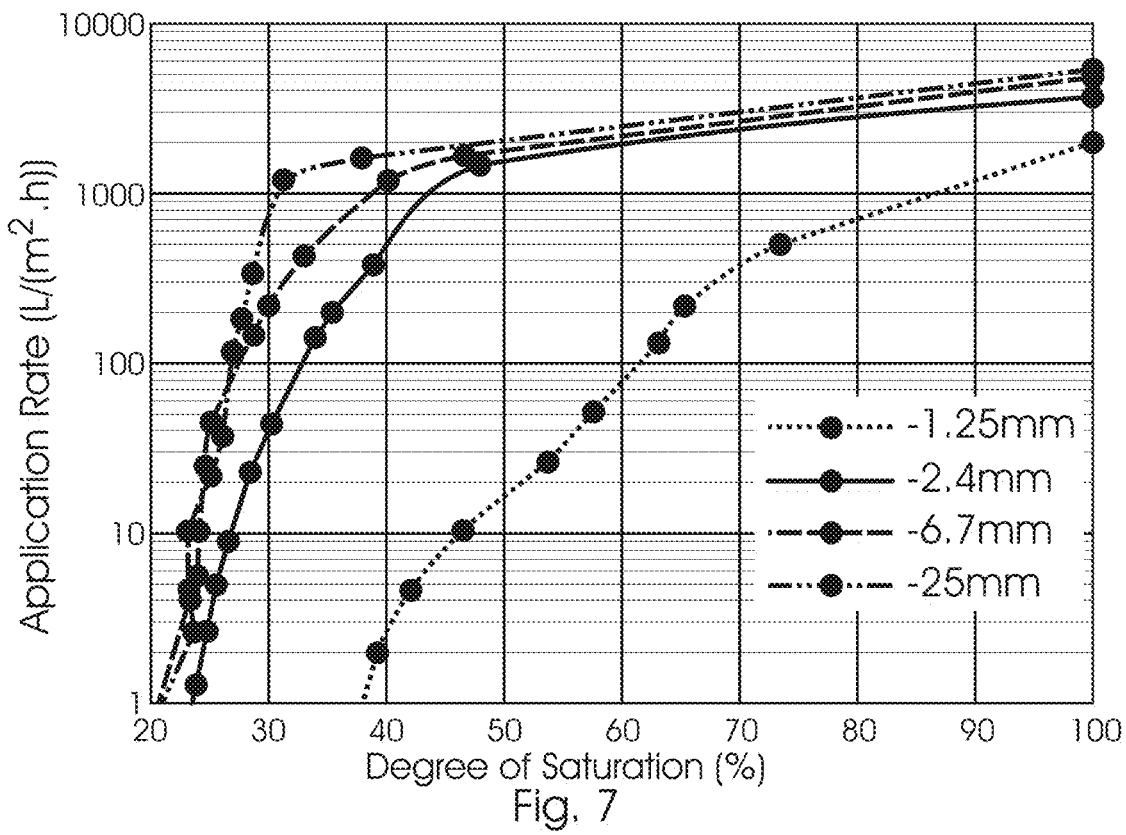
FIG. 7 is a graph illustrating the degree of saturation as a function of application rate for samples of a copper ore prepared into different size fractions.

To further demonstrate the impact of micro-permeability on achievable extractions, samples of the same ore were ground to less than 1.25 mm before utilizing coarse particle flotation to recover a concentrate and reject a lower grade sand. The resultant sand, which was towards the more difficult end of the size distribution for optimum macro-permeability, illustrated acceptable hydraulic conductivity for leaching but a significantly higher degree of saturation at equivalent flows as compared to the coarser sand fractions, as shown in FIG. 7, which shows an exponential improvement in degree of saturation for the fractions with a particle size with a $P_{80}$ of greater than 1 mm. From FIG. 7 it is clear that in order to achieve a suitable degree of saturation, a particle size with a P80 greater than around 1 mm is required. In leaching systems where reprecipitation of such species as oxides of iron, or sulphates of calcium and aluminium, or where the formation of elemental sulphur occurs, this higher degree of saturation may become increasingly problematic. The precipitation of such species within the heap, is common in many heap leach applications.

The −1.25 mm sand, was leached in both acidic cupric chloride and ferric sulfate leachants at 25° C. in identical conditions to the other fractions. FIG. 3 shows that extraction in the chloride system was more than 85% in 100 days, with the chalcopyrite proving the slowest mineral species to dissolve. In the sulfate system, 75% extraction was achieved in the same time, with high dissolution of each copper mineral species except chalcopyrite.

Figure 4:
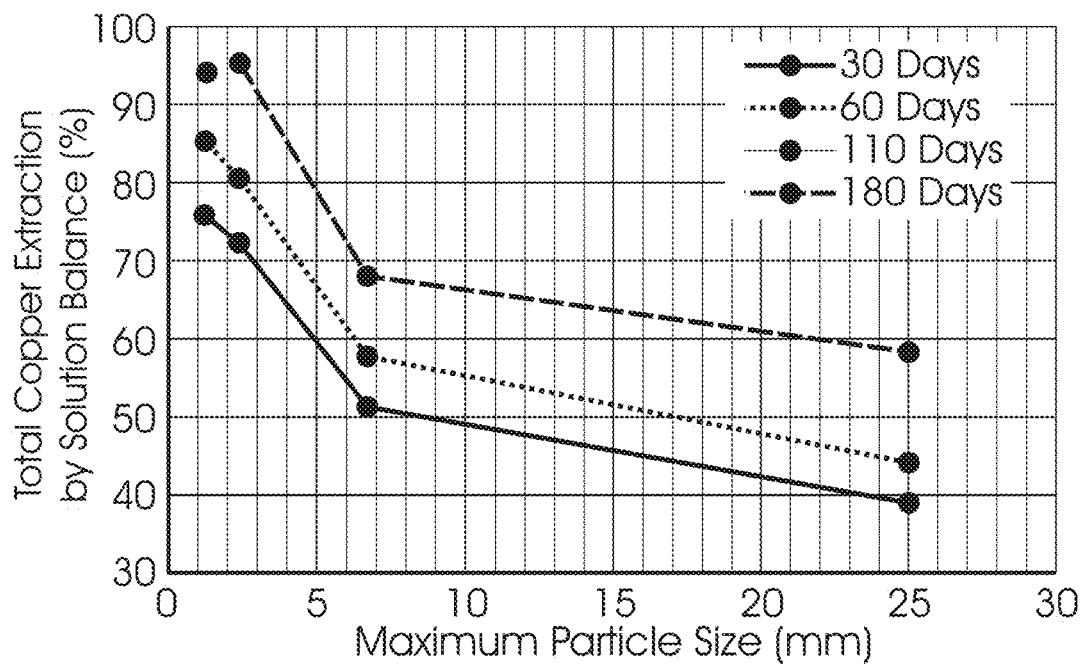
FIG. 4 is a graph showing the inventory-corrected total copper extractions as a function of particle size and time.

FIG. 4 more clearly illustrates the increasing overall extraction with decreasing particle size, consistent with the previously quoted work of Miller et. al. on mineral exposure vs. particle size. Most surprisingly, there was also a marked increase in leaching rate associated with the particle size, suggesting much improved access of the leachant to the surface of the valuable mineral grains. The ideal size range for rapid and complete extraction under relatively mild leaching conditions is less than around 6 mm.

Figure 5:
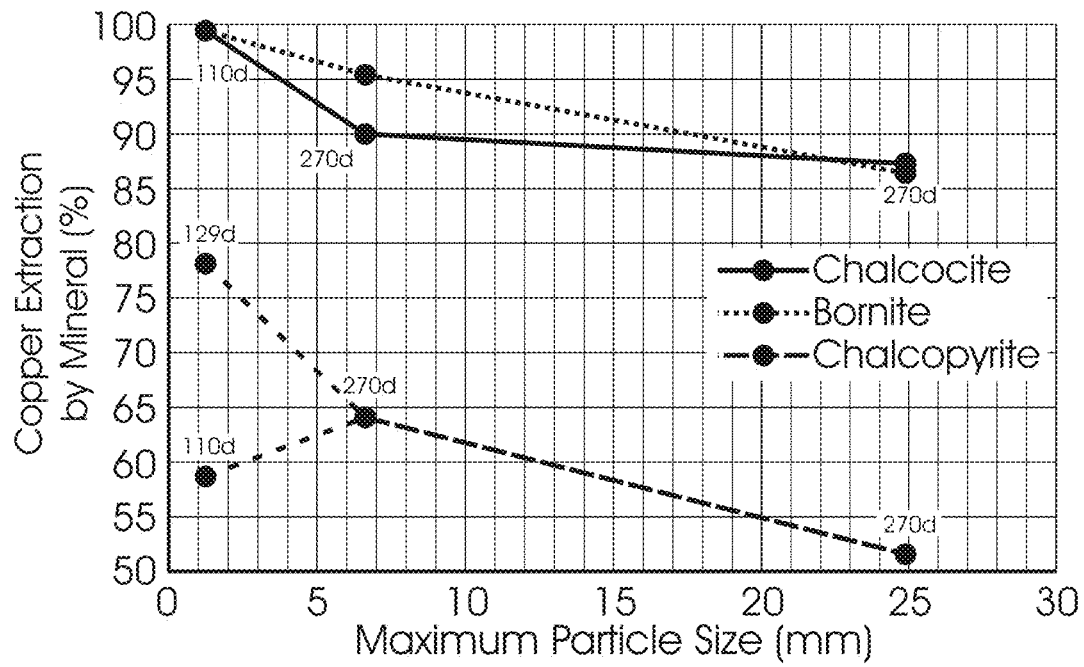
FIG. 5 is a graph showing the mineral extractions as a function of particle size and time.

This effect of particle size highlighted further when considering the rate of dissolution of the different copper minerals in FIG. 5.

The more easily leached minerals, in this case chalcocite and bornite, are less dependent on particle size than the more refractory chalcopyrite for achieving extractions in excess of 85%. In the finest size fraction examined, in both leachant systems, the extraction of the oxide and secondary sulphide fractions, consisting of predominantly delafossite, chalcocite and bornite, were higher than 98%. The impact of increasing rate and extent of extraction as a function of particle size below about 6 mm is significant and unexpected. An additional 6 m column was operated on the −1.25 mm fraction under identical experimental conditions and demonstrated an extraction of copper from chalcopyrite of almost 80% in about 190 days. For extension of effective heap leaching to recover the more refractory minerals, such as chalcopyrite in the case of primary copper ores, size is a key parameter.

Figure 6:
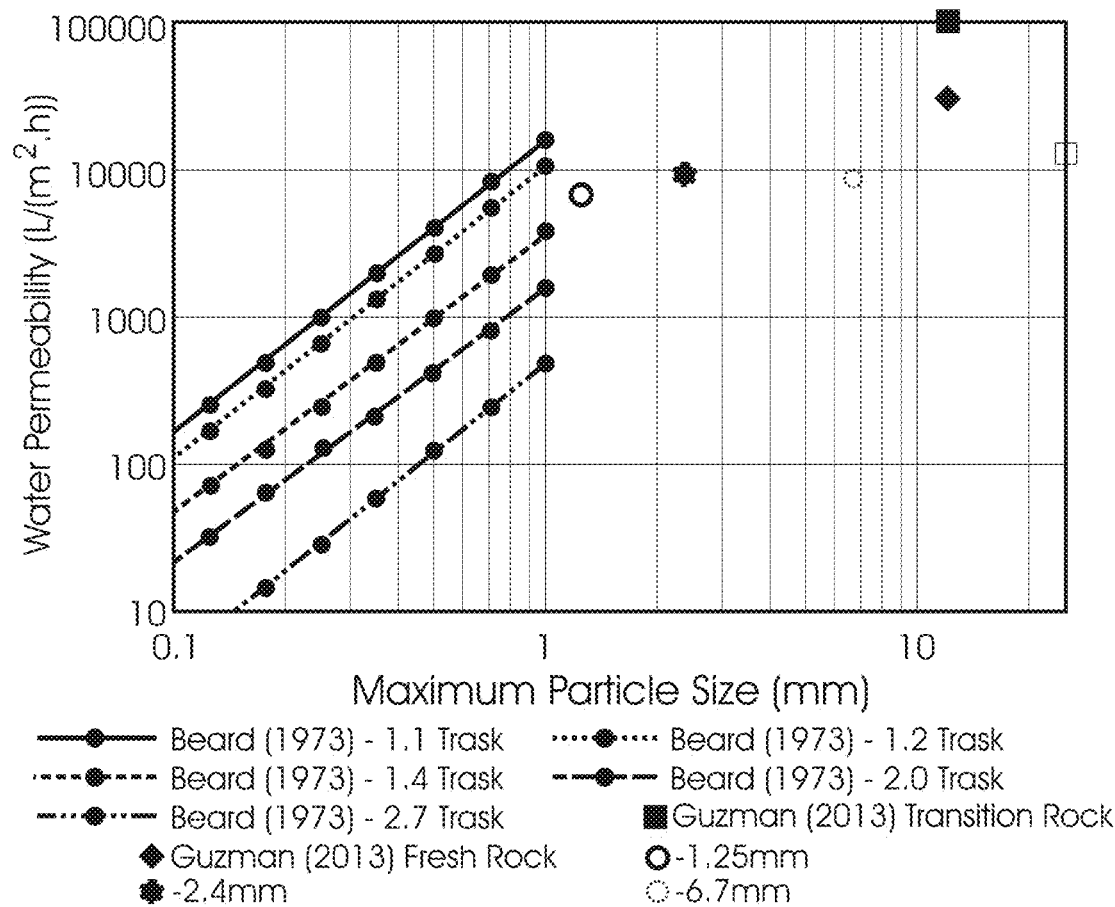
FIG. 6 is a graph showing hydraulic permeability of several samples as a function of maximum particle size and the P90/P10 ratio, or sorting coefficient.

On the basis of micro-permeability alone, it would be advantageous to further reduce the particle size, the offsetting factor is macro-permeability. FIG. 6 shows how macro-permeability reduces exponentially with decreasing particle size, even for extremely well sorted sands. The minimum particle size is thus set by a limit of ensuring effective macro-permeability for the practical application of heap leaching as the primary method of values recovery from a particular ore and leachant system.

Figure 8:
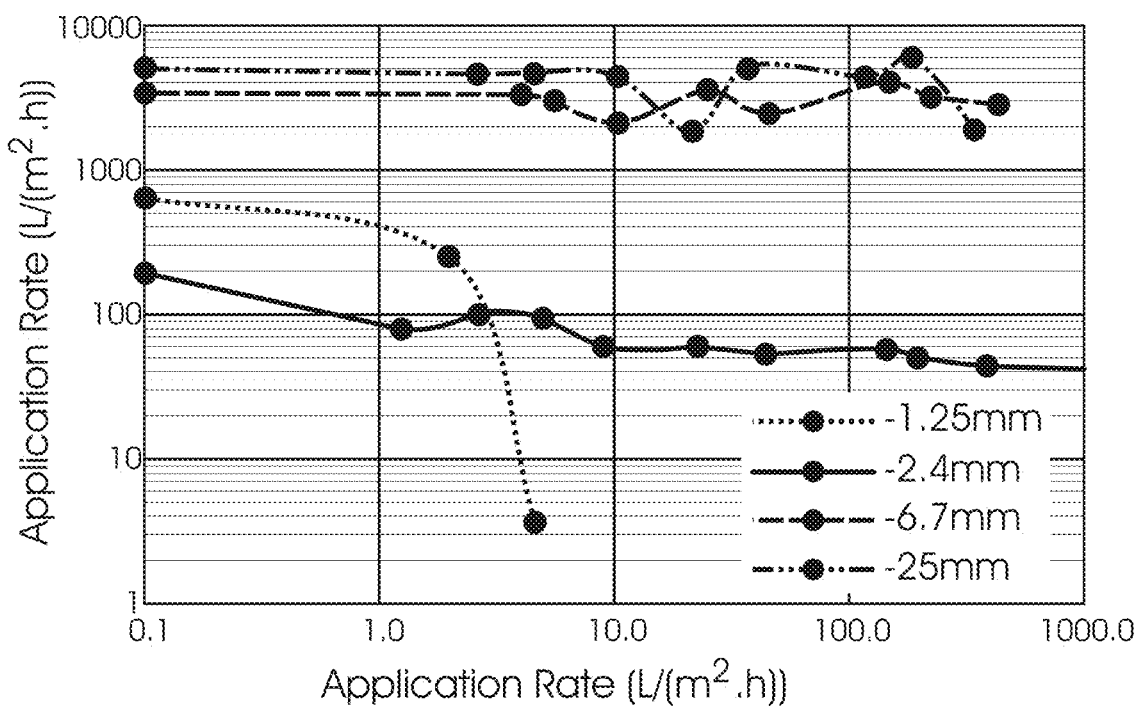
FIG. 8 is a graph showing the dependence of air conductivity on application rate for the copper ore samples reflected in FIG. 7.

Hydrodynamic measurements of the fractions that were column leached are presented in FIGS. 7, 8 and 9. Given the narrow particle size distributions and the absence of significant fines, the samples showed minimal compaction with dry bulk densities increasing from about 1.3 t/m$^3$ to about 1.4 t/m$^3$ with an imposed compression equivalent to 40 m of stack height. These results show that, while the finest fraction examined demonstrated excellent micro-permeability, and corresponding high extractions, a significant decrease in the macro-permeability was observed. Higher degrees of saturation at irrigation rates applicable to heap leaching may prove more problematic for effective air permeability as shown in FIG. 8. This may become even more problematic for cases where additional fine precipitates are formed within the heap. The marginally coarser fractions demonstrated excellent macro-permeability, having acceptable degrees of saturation and excellent air permeability at application rates applicable to heap leaching, resisted consolidation and exhibit rapid and extensive desaturation on cessation of irrigation.

In the context of heap leaching the results illustrate that, with a selection of particle size $P_{80}$ of less than 5 mm and a $P_{90}/P_{10}$ ratio of less than 20 and greater than 3, with appropriate adjustment of the particle size distribution of the ore, it is possible to achieve exponential micro-permeability for rapid sand heap leaching, whilst maintaining sufficient macro-permeability to create a free draining heap with excellent distribution of leachant and air.

With favorable mineralogy, or sufficient time for dissolution of the slower reacting mineral species, extractions higher than 90% can be achieved from the sand in sand heap leach. These extractions are, quite unexpectedly, higher than the 80-85% extraction typically achieved by flotation of the ore used in the experimentation, indicating that sand heap leaching is equally attractive for both low- and high-grade ores, and particularly attractive for leaching of highly oxidized ores. In addition, the comminution to a $P_{80}$ less than 5 mm is much easier than that required for flotation, the heap leaching enables direct production of cathode, and the overall environmental footprint is lower.

REFERENCES (THE CONTENT OF WHICH IS INCORPORATED HEREIN BY REFERENCE)

Filmer and Alexander—WO2016/170437
Filmer and Alexander—WO2018/234880

Muller—WO2007/134343A2
Kohr—U.S. Pat. No. 6,146,444
Robertson—J. S. Afr. Inst. Min. Metall. vol. 112 n.12 Johannesburg January 2012
Watling—Hydrometallurgy 140 (2013) 163-180
Miller—Int. J. Miner. Process. 72 (2003) 331-340 https://agupubs.onlinelibrary.wiley.com/doi/full/10.1002/2017WR020888
Beard and Weyl, 1973, Influence of texture on porosity and permeability of unconsolidated sand, The American Association of Petroleum Geologists Bulletin, Vol. 57, No. 2, 349-369
Guzman, 2013, Implications of hydrodynamic testing for heap leach design, Hydroprocess 2013, Conference Paper

The invention claimed is:

1. A method of preparing and leaching of an ore containing metal values in a heap leach, the method including the steps of:
   crushing an ore containing metal values to provide a sand containing metal values with a particle size $P_{80}$ of less than 5 mm and greater than 1 mm;
   classifying the sand to provide a classified sand with a particle size $P_{10}$ of greater than 0.15 mm, and a particle size $P_{90}/P_{10}$ ratio of less than 25 and greater than 3;
   forming a heap from the classified sand; and
   distributing leachant and air through the heap to leach metal values from the sand;
   wherein sand heap leaching is the primary recovery method of values from the ore, and more than 50% of the ore is processed by sand heap leach, and wherein the sand is stacked in lifts of height of greater than 5 meters.

2. The method claimed in claim 1, wherein the ore is crushed to a $P_{80}$ of less than 3 mm and greater than 1 mm.

3. The method claims in claim 2, wherein the ore is crushed to a $P_{80}$ of about 2 mm and greater than 1 mm.

4. The method claimed in claim 1, wherein the classified sand has a $P_{10}$ of greater than 0.25 mm.

5. The method claimed in claim 4, wherein the classified sand has a $P_{10}$ of greater than 0.3 mm.

6. The method claimed in claim 5, wherein the classified sand has a $P_{10}$ of greater than 0.4 mm.

7. The method claimed in claim 1, wherein the classified sand has a $P_{90}/P_{10}$ ratio of less than 20 and greater than 3.

8. The method claimed in claim 7, wherein the classified sand has a $P_{90}/P_{10}$ ratio of less than 18 and greater than 3.

9. The method claimed in claim 8, wherein the classified sand has a $P_{90}/P_{10}$ ratio of less than 15 and greater than 3.

10. The method claimed in claim 1, wherein the classified sand has a $P_{90}/P_{10}$ ratio of greater than 5 and less than 25.

11. The method claimed in claim 10, wherein the classified sand has a $P_{90}/P_{10}$ ratio of greater than 8 and less than 25.

12. The method claimed in claim 1, wherein the classified sand and heap formed from the classified sand have a water permeability greater than $10^{-5}$ m/s.

13. The method claimed in claim 12, wherein the classified sand and heap formed from the classified sand have a water permeability greater than $5 \times 10^{-4}$ m/s.

14. The method claimed in claim 1, wherein sand heap leaching is the primary recovery method of values from the ore, and more than 60% of the ore is processed by sand heap leach.

15. The method claimed in claim 14, wherein sand heap leaching is the primary recovery method of values from the ore, and more than 70% of the ore is processed by sand heap leach.

16. The method claimed in claim 1, wherein the sand heap leach is undertaken in a fixed or a dynamic heap with a residence time of less than 2 years.

17. The method claimed in claim 16, wherein the residence time is less than 6 months.

18. The method claimed in claim 17, wherein the residence time is less than 3 months.

19. The method claimed in claim 1, wherein the heap contains less than 15% water within 2 weeks of ceasing irrigation.

20. The method claimed in claim 1, wherein the heap is subjected to more than one irrigation and drain cycles, to sequentially enhance aeration and leaching.

21. The method claimed in claim 1, wherein multiple leachants are used sequentially to remove gangue and then to recover the valuable components from the sand heap.

22. The method claimed in claim 21, wherein an ore containing both copper and gold is heap leached initially to extract the copper, then washed with water, and subsequently leached with a different reagent to extract the gold.

23. The method claimed in claim 1, wherein the classified sand is deposited on the heap by being flung from a discharge point using a hydraulic or mechanical device.

24. The method claimed in claim 19, wherein the sand is stacked in lifts of height of greater than 10 meters.

25. The method claimed in claim 24, wherein the sand is stacked in lifts of height of greater than 20 meters.

26. The method claimed in claim 25, wherein the sand is stacked in lifts of height of up to 40 meters.

27. The method claimed in claim 1, wherein the sand is leached in a dynamic heap, which is then removed from the dynamic pad by hydraulic mining techniques.

28. The method claimed in claim 27, wherein the heap is constructed with air injection points to control the redox potential and temperature of zones across the heap.

29. The method claimed in claim 1, wherein the metal values are selected from gold, copper, nickel, zinc and uranium, and the ores containing said metal values are selected from gold ore, copper ore, nickel ore, zinc ore, and uranium ore.

* * * * *